United States Patent
Kim et al.

(10) Patent No.: US 7,548,767 B2
(45) Date of Patent: Jun. 16, 2009

(54) LOW POWER WARNING IN A PORTABLE COMMUNICATION DEVICE BASED ON PREDICTED DEVICE UTILIZATION

(75) Inventors: Neil Y. Kim, Laguna Niguel, CA (US); Pieter Vorenkamp, Laguna Niguel, CA (US); Sumant Ranganathan, Sunnyvale, CA (US); Chun-ying Chen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 503 days.

(21) Appl. No.: 11/166,305

(22) Filed: Jun. 24, 2005

(65) Prior Publication Data

US 2006/0001402 A1    Jan. 5, 2006

Related U.S. Application Data

(60) Provisional application No. 60/585,187, filed on Jul. 1, 2004.

(51) Int. Cl.
   *H04M 1/00* (2006.01)
(52) U.S. Cl. .......... 455/574; 455/343.6; 340/336.1; 320/132
(58) Field of Classification Search .......... 455/574, 455/343.1, 343.2, 343.5, 343.6, 550.1, 572; 320/127, 106, 114, 132; 340/335, 336.1
   See application file for complete search history.

(56) References Cited

U.S. PATENT DOCUMENTS

| | | | |
|---|---|---|---|
| 6,160,490 A * | 12/2000 | Pace et al. | 340/7.37 |
| 6,201,372 B1 * | 3/2001 | Green et al. | 320/132 |
| 6,710,578 B1 * | 3/2004 | Sklovsky | 320/127 |
| 2001/0015635 A1 * | 8/2001 | Leppo et al. | 320/116 |
| 2003/0087682 A1 * | 5/2003 | Cathey et al. | 455/574 |
| 2003/0158609 A1 * | 8/2003 | Chiu | 700/22 |
| 2003/0227390 A1 * | 12/2003 | Hung et al. | 340/636.1 |
| 2004/0214613 A1 * | 10/2004 | Shin | 455/567 |
| 2006/0205443 A1 * | 9/2006 | Simoens et al. | 455/574 |

* cited by examiner

*Primary Examiner*—Nhan T Le
(74) *Attorney, Agent, or Firm*—McAndrews, Held & Malloy, Ltd.

(57) ABSTRACT

A system and method for providing a low power warning in a portable communication device based on predicted device utilization. Various aspects of the present invention may comprise monitoring power utilization for a portable communication device. A power utilization profile may be determined based, at least in part, on the results of the power utilization monitoring. Power availability for the portable communication device may be determined. Future power need for the portable communication device may be predicted based, at least in part, on the determined power utilization profile. The predicted future power need and the determined power availability may be analyzed to determine whether to generate a warning indicating a potential future power shortage. If it is determined that a potential future power shortage warning should be generated, such a warning may be generated. Such a warning may, for example, be generated in accordance with user specifications.

30 Claims, 2 Drawing Sheets

LOW POWER WARNING IN A PORTABLE COMMUNICATION DEVICE BASED ON PREDICTED DEVICE UTILIZATION

CROSS-REFERENCE TO RELATED APPLICATIONS/INCORPORATION BY REFERENCE

This patent application is related to and claims priority from provisional patent application Ser. No. 60/585,187, filed Jul. 1, 2004, and entitled "LOW POWER WARNING IN A PORTABLE COMMUNICATION DEVICE BASED ON PREDICTED DEVICE UTILIZATION," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Users of portable electronic devices (e.g., portable communication devices) utilize the devices differently at different points throughout the day, week, etc. For example, a user may utilize a cellular phone or portable email device a relatively small amount in the office and a relatively large amount during the two hours immediately after leaving work. The user may, for example, also utilize a portable communication device relatively little in the middle of the night and at relatively moderate levels the hour prior to arriving at work. Further for example, a user may utilize a portable communication device differently on different types of days (e.g., workdays, weekend days, holidays, Wednesdays, etc.) Accordingly, consumption of energy in a portable communication device may vary according to a particular user's use characteristics, and such use characteristics may vary according to day and time of day.

Additionally, users may restore energy (e.g., by charging) to a portable communication device differently. For example, a first user may typically restore energy from an automobile charger during a daily commute to work, while a second user may typically restore energy from am office charger during the first hour of the work morning. Also, a user may restore energy to a portable communication device differently on different days. For example, a user may utilize a car charger on the drive to work every weekday morning and utilize a desktop charger at home during the weekends. Accordingly, restoration of energy in a portable communication device may vary according to a particular user's energy restoration routine.

Users of portable communication devices often run out of finite electrical power (or energy). Users of portable communication devices also often find themselves in situations where they cannot access enough electrical power to utilize their portable communication devices to their full potential.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for providing a low power warning in a portable electronic device (e.g., a portable or mobile communication device) based on predicted device utilization, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

As an initial matter, the following discussion will generally include references to "power." For example, the following discussion may generally refer to power monitoring, power prediction, power usage, power recharging, etc. It must be noted that the term "power" is generally utilized herein to mean either "power" or "energy" or related concepts. That is, the terms "energy" and "power" may be utilized interchangeably herein. For example and without limitation, the following discussion will refer to monitoring power, which may, in various contexts apply equally well to monitoring power and/or energy. Accordingly, the scope of various aspects of the present invention is by no means to be limited by characteristics of, or differences between, the concepts of "power" and "energy" or related concepts.

Figure 1:
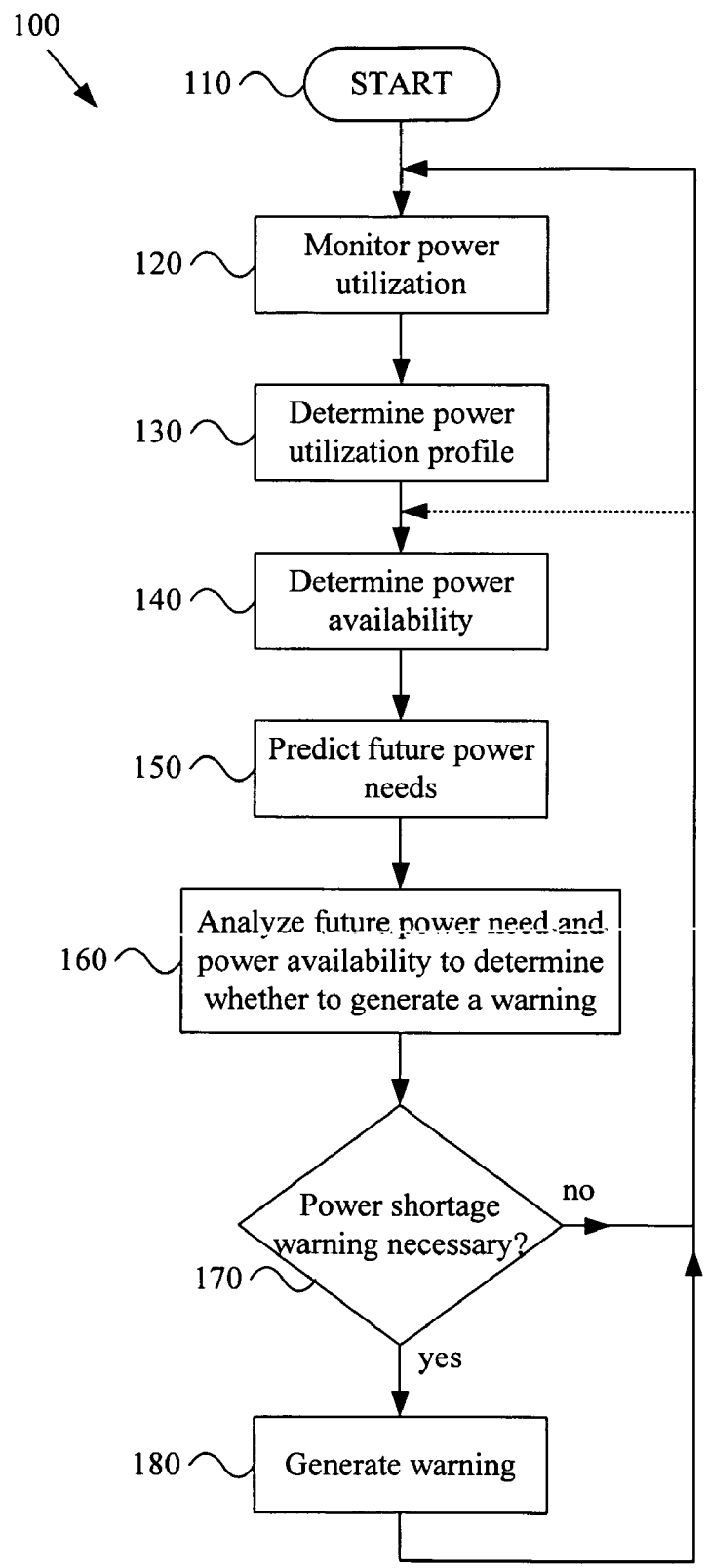
FIG. 1 illustrates an exemplary method for providing a low power warning in a portable communication device based on predicted device utilization, in accordance with various aspects of the present invention.

FIG. 1 illustrates an exemplary method 100 for providing a low power warning in a portable electronic device (e.g., a portable communication device) based on predicted device utilization, in accordance with various aspects of the present invention. The exemplary method 100 may begin at step 110. The exemplary method 100 may begin for any of a large variety of reasons. For example and without limitation, the method 100 may begin when a portable communication device is powered up. Also for example, the method 100 may begin when a user explicitly commands the method 100 to begin. Further for example, the method 100 may begin when available power for the portable communication device drops below a threshold. Still further for example, the method 100 may begin as a function of historical device utilization. Accordingly, the scope of various aspects of the present invention should not be limited by a particular circumstance or condition that causes the method 100 to begin.

The exemplary method 100 may, at step 120, comprise monitoring power utilization for the portable communication device. For example and without limitation, step 120 may comprise monitoring power consumption and/or power restoration (e.g., charging or utilization of back-up energy sources).

Step 120 may, for example, comprise monitoring power utilization continuously and/or periodically. Step 120 may, for example, comprise determining power consumption during or after an instance of device usage. For example, in an exemplary scenario comprising a cellular telephone, step 120 may comprise determining power consumption at the end of a phone call (e.g., by determining remaining power in a power source or by estimating power usage for the phone call). In another exemplary scenario involving a portable email device, step 120 may comprise determining power consumption at the end of an email message exchange sequence. In a further exemplary scenario involving a portable Internet web surfing apparatus, step 120 may comprise monitoring and/or estimating power usage periodically (e.g., every five minutes during a web surfing session).

Step 120 may utilize any of a variety of techniques and/or apparatus to monitor power utilization. For example and without limitation, step 120 may comprise utilizing power, voltage and/or current sensing apparatus. Step 120 may, for example, comprise monitoring power commands to communication circuitry to determine an indication of power utilization. Step 120 may, for example, comprise monitoring signal processing activities (e.g., data decoding, detecting, error correcting, etc.). Step 120 may, for example, comprise monitoring transmission and reception power. Further for example, step 120 may comprise monitoring the type of particular communication protocol and/or data encoding/decoding strategy being utilized.

In general, step 120 may comprise monitoring power utilization for the portable communication device. Accordingly, the scope of various aspects of the present invention should not be limited by a particular way of monitoring power utilization or any particular apparatus or technique that may be utilized to monitor power utilization.

The exemplary method 100 may, at step 130, comprise determining a power utilization profile for the portable communication device based at least in part on results of the power utilization monitoring performed at step 120. Step 130 may comprise determining a power utilization profile in any of a variety of manners. Further, the power utilization profile may have any of a large variety of profile characteristics.

For example and without limitation, step 130 may, for example, comprise generating a set of information comprising information of power utilization versus time. A power utilization profile may, for example, comprise a data table in memory or a list of power utilization characteristics. A power utilization profile may, for example, comprise information of power utilization as a function of time of day, day of the week, type of day (e.g., workday, weekend day, holiday, etc.), etc. A power utilization profile may, for example, comprise information of times at which power utilization is at a particular usage level. A power utilization profile may, for example, comprise information of power supply charging or restoration (e.g., according to time of day or type of day). Further for example, a power utilization profile may comprise a mathematical formula or other description of power utilization. In general, a power utilization profile may comprise any of a large variety of power utilization characteristics (e.g., power usage and/or restoration).

In general, step 130 may comprise determining a power utilization profile for the portable communication device based at least in part on results of the power utilization monitoring performed at step 120. Accordingly, the scope of various aspects of the present invention should not be limited by characteristics of a particular power utilization profile or way of constructing such a profile.

The exemplary method 100 may, at step 140, comprise determining power availability for the portable communication device. Step 140 may comprise determining power availability in any of a variety of manners. For example and without limitation, step 140 may, for example, comprise monitoring power availability for the portable communication device. Step 140 may, for example, comprise measuring remaining power availability in a power supply (e.g., a battery). Such measuring may, for example, comprise measuring battery voltage, current or output power characteristics.

Step 140 may, for example, comprise predicting battery discharge behavior. For example, step 140 may comprise utilizing information of an expected or predicted battery discharge profile to determine power availability. Such a battery discharge profile may, for example, be based on manufacturer-supplied battery discharge information. Such a battery discharge profile may, for example, be based on battery discharge testing results for the battery or type of battery in question. Such a battery discharge profile may, for example, be based on monitored historical discharge and/or charge behavior for a particular battery of the portable communication device. A battery discharge profile may, for example, be based on a table of data or may, for example, be based on a mathematical formula or other description. Note that a battery discharge profile may change over time (e.g., as a function of battery usage or age, environmental conditions, etc.). Such a change may, for example, be reflected in a discharge profile (e.g., empirically and/or analytically).

In general, step 140 may comprise determining power availability for the portable communication device. Accordingly, the scope of various aspects of the present invention should not be limited by characteristics of particular ways of determining power availability or apparatus that may be utilized to monitor power-related characteristics.

The exemplary method 100 may, at step 150, comprise predicting future power need for the portable communication device based at least in part on the power utilization profile determined at step 130. Step 150 may comprise predicting such future power need in any of a variety of ways. For example and without limitation, step 150 may comprise predicting future power need for a predetermined time. Such a predetermined time may, for example, be an absolute time (e.g., 6:30 PM) or a relative time (e.g., two hours from the present time).

In an exemplary scenario, step 150 may comprise predicting future power need for a programmed or analytically determined commuting time. In another exemplary scenario, step 150 may comprise predicting future power need for a time period from the present moment until the next typical recharging time. In another exemplary scenario, step 150 may comprise predicting a future point in time at which the portable communication device is likely to run out of power unless recharged. Step 150 may, for example, comprise determining a point in the future at which predicted future power need exceeds determined power availability.

Step 150 may, for example, comprise predicting future power need in a manner commensurate with the nature of the power utilization profile determined at step 130. For example, in an exemplary scenario where the power utilization profile comprises a table of time blocks versus power utilization, step 150 may comprise summing products of time blocks and respective power utilization. In another exemplary scenario where the power utilization profile is characterized by a mathematical formula, step 150 may comprise solving the mathematical formula for a particular time or set of times.

In general, step 150 may comprise predicting future power need for the portable communication device based at least in part on the determined power utilization profile. Accordingly, the scope of various aspects of the present invention should not be limited by characteristics of particular ways of predicting future power need or particular apparatus or techniques utilized for making such a prediction.

The exemplary method 100 may, at step 160, comprise analyzing the predicted future power need (e.g., as determined at step 150) and determined power availability (e.g., as determined at step 140) to determine whether to generate a warning indicating a potential future power shortage. Step 160 may comprise performing such analysis in any of a variety of manners.

For example and without limitation, step 160 may comprise analyzing times at which the portable communication device is typically recharged. In an exemplary scenario, step 160 may determine that even though the portable communication device is predicted to run out of power at 7:00 PM, the portable communication device is typically charged at 6:00 PM, and thus no power warning is necessary. In the same exemplary scenario, step 160 may alternatively comprise determining that a low level warning may still be necessary.

Step 160 may, for example, comprise analyzing margin of error in at least one of the predicted future power need (e.g., as predicted at step 150) and determined power availability (e.g., as determined at step 140). Such analysis may, for example, comprise analyzing information of variance or certainty of the power utilization profile determined at step 130. Such analysis may, for example, comprise determining a level of probability that the portable communication device will run out of power. In an exemplary non-limiting scenario, step 130 may comprise determining that a power shortage certainty level within one standard deviation (or above a particular certainty percentage threshold) warrants a low power warning, while a less certain prediction does not.

Step 160 may, for example, comprise determining a level or type of warning to generate. For example and without limitation, step 160 may comprise determining a first level of warning if there is a significant chance that the portable communication device will run out of power, a second level of warning if the portable communication device will probably run out of power, and a third level of warning if it is highly likely that the portable communication device will run out of power.

In general, the step 160 may comprise analyzing the predicted future power need and determined power availability to determine whether to generate a warning indicating a potential future power shortage and/or to determine what type of warning to generate. Accordingly, the scope of various aspects of the present invention should not be limited by characteristics of particular ways of analyzing predicted future power need and determined power availability to determine whether to generate such a warning or to determine what type of warning to generate.

The exemplary method 100 may, at step 170, comprise controlling the flow of the exemplary method 100 execution based at least in part on the results of the step 160 analysis. For example, if step 170 determines that a warning indicative of a potential future power shortage is warranted, then step 170 may direct method 100 flow to step 180. Conversely, if step 170 determines that such a warning is not necessary, then step 170 may direct method 100 flow to a step for continued monitoring and/or analysis. In a first exemplary scenario, step 170 may direct method 100 flow back to step 120 for monitoring power utilization. In a second exemplary scenario, step 170 may direct method 100 flow back to step 140 for monitoring power availability. Note that the scope of various aspects of the present invention should not be limited by a particular method step that may be performed when the method 100 determines that a warning is not necessary or after such a warning is generated.

The exemplary method 100 may, at step 180, comprise generating a warning of a potential future power shortage. For example, if step 170 determines that a potential future power shortage warning should be generated, then step 180 may comprise generating the potential future power shortage warning.

The potential future power shortage warning may comprise any of a variety of warning characteristics. For example and without limitation, a warning may be visible, audible, or physical. As mentioned previously, such a warning may be characterized by a warning level. Each level may, for example, comprise an associated warning characteristic. For example and without limitation, a portable communication device may provide a visual indication when there is a significant chance that the portable communication device will run out of power, a physical indication (e.g., vibrate) when it is probable that the portable communication device will run out of power, and an audible indication (e.g., beep or ring) when it is highly probable that the portable communication device will run out of power.

Step 180 may, for example, comprise communicating with a user of the portable communication device to communicate power warning control information. Step 180 (or other aspects of the method 100) may thereby provide for user control of characteristics of the power warning(s). For example and without limitation, a user may control characteristics of various warning types. A user may, for example, turn the potential power shortage warning on or off. A user may, for example, specify levels at which warnings should occur (e.g., probability or certainty levels). A user may, for example, associate warning characteristics with various warning levels. A user may then, for example, respond to various warning levels with various respective power conservation actions (e.g., by forcing the portable communication device into one or more various power-save modes). Further, in various non-limiting exemplary scenarios, the portable communication device may combine communicating warning information with automatically taking various power-save actions.

In general, the step 180 (or another aspect of the method 100) may comprise communicating warning and/or warning control information with a user. Accordingly, the scope of various aspects of the present invention should not be limited by characteristics of particular warnings or particular user communications regarding such warnings.

Figure 2:
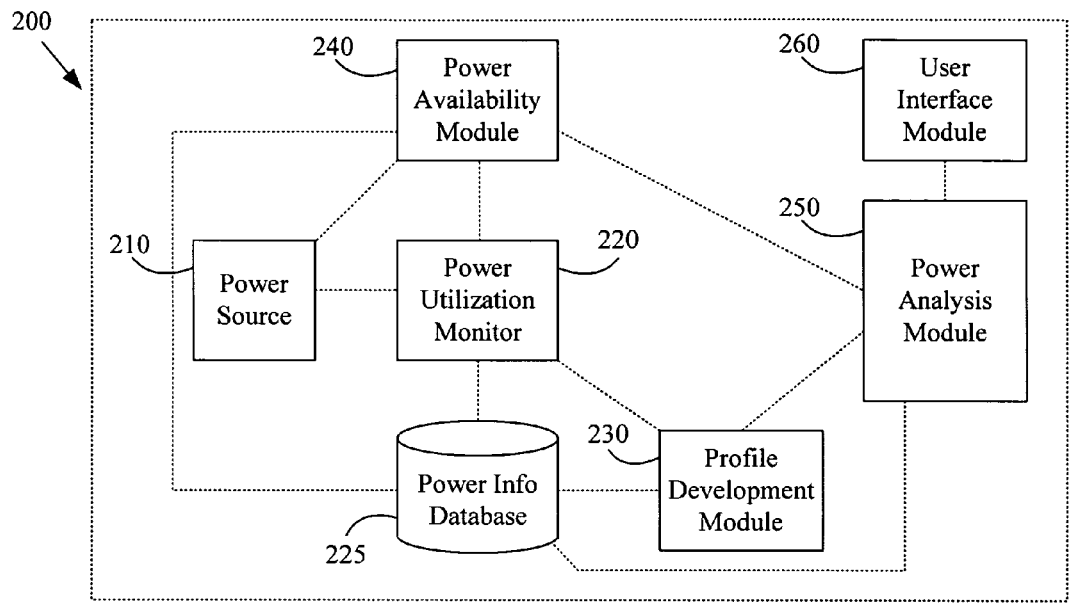
FIG. 2 illustrates an exemplary system that provides a low power warning in a portable communication device based on predicted device utilization, in accordance with various aspects of the present invention.

FIG. 2 illustrates an exemplary system 200 that provides a low power warning in a portable electronic device (e.g., a portable communication device) based on predicted device utilization, in accordance with various aspects of the present invention. The exemplary system 200 may, for example and without limitation, perform various aspects of the exemplary method 100 illustrated in FIG. 1 and discussed previously.

The exemplary system 200 may begin processing for any of a large variety of reasons. For example and without limitation, the system 200 may begin processing when a portable communication device is powered up. Also for example, the system 200 may begin processing when a user explicitly commands the system to begin. Further for example, the system 200 may begin processing when available power for the portable communication device drops below a threshold. Still further for example, the system 200 may begin processing as a function of historical device utilization. Accordingly, the scope of various aspects of the present invention should not be limited by a particular circumstance or condition that causes the exemplary system 200 to begin processing.

The exemplary system 200 may comprise a power source 210. The power source 210 may, for example, be capable of providing a relatively finite supply of power (e.g., to the portable communication device). The power source 210 may, for example, comprise a renewable (or rechargeable) supply of power. In one exemplary scenario, the power source 210 may comprise a rechargeable battery. In another exemplary scenario, the power source 210 may comprise a main and a back-up power source. In general, the power source 210 may be capable of providing a relatively finite source of electrical power. Accordingly, the scope of various aspects of the present invention should not be limited by characteristics of a particular finite power source.

The exemplary system 200 may comprise a power utilization monitor 220 that monitors power utilization for the portable communication device. For example and without limitation, the power utilization monitor 220 may perform various aspects of the exemplary method 100 (e.g., step 120) illustrated in FIG. 1 and discussed previously.

For example, the power utilization monitor 220 may monitor power consumption and/or power restoration (e.g., charging or utilization of energy sources and/or back-up energy sources, such as the power source 210). The exemplary power utilization monitor 220 may, for example, monitor power utilization continuously or periodically (e.g., by periodically determining remaining power). Such power utilization may, for example comprise aspects of power consumption and/or power restoration. The power utilization monitor may, for example, determine power consumption during or after an instance of device usage.

For example, in an exemplary scenario comprising a cellular telephone, the power utilization monitor 220 may determine power consumption at the end of a phone call (e.g., by determining remaining power in the power source 210 or monitoring power provided to circuits in the cellular telephone by the power source 210). In another exemplary scenario involving a portable email device, the power utilization monitor 220 may determine power consumption at the end of an email message exchange sequence. In a further exemplary scenario involving a portable Internet web surfing apparatus, the power utilization monitor 220 may monitor and/or estimate power usage periodically (e.g., every five minutes during a web surfing session).

The power utilization monitor 220 may utilize any of a variety of techniques and/or comprise any of a variety of apparatus to monitor power utilization. For example and without limitation, the power utilization monitor 220 may comprise or utilize power, voltage and/or current sensing apparatus. The power utilization monitor 220 may, for example, monitor power control commands to communication circuitry to determine an indication of power utilization. The power utilization monitor 220 may, for example, monitor signal processing activities (e.g., data decoding, detecting, error correcting, etc.). The power utilization monitor 220 may, for example, monitor transmission and reception power. Further for example, the power utilization monitor may monitor the type of particular communication protocol and/or data encoding/decoding strategy being utilized.

In general, the power utilization monitor 220 may monitor power utilization for the portable communication device. Accordingly, the scope of various aspects of the present invention should not be limited by characteristics of a particular module or apparatus that monitors power utilization.

The exemplary system 200 may comprise a power information database 225. Various components of the system 200 may store power-related information and other information in the power information database 225. For example and without limitation, the power utilization monitor 220 may store information in the power information database 225. The power information database 225 may comprise any of a large variety of database characteristics. For example, the power information database 225 may be local to the portable communication device or may be non-local and networked to the portable communication device. For example, the power information database 225 may comprise chip memory or hard drive characteristics. In general, the power information database 225 may store power-related information. Accordingly, the scope of various aspects of the present invention should not be limited by characteristics of a particular database.

The exemplary system 200 may comprise a profile development module 230 that determines a power utilization profile for the portable communication device based at least in part on power utilization information obtained by the power utilization monitor 220. The profile development module 230 may, for example and without limitation, perform various functionality of the exemplary method 100 (e.g., step 130) illustrated in FIG. 1 and discussed previously.

For example, the exemplary profile development module 230 may generate a set of information comprising information of power utilization versus time. A power utilization profile may, for example, comprise a data table in memory (e.g., the power information database 225) or a list of power utilization characteristics. A power utilization profile may, for example, comprise information of power utilization as a function of time of day, day of the week, type of day (e.g. workday, weekend day, holiday, etc.), etc. A power utilization profile may, for example, comprise information of times at which power utilization is at a particular usage level. A power utilization profile may, for example, comprise information of power supply charging or restoration (e.g., according to time of day or type of day). Further for example, a power utilization profile may comprise a mathematical formula or other description of power utilization. In general, a power utilization profile may comprise any of a large variety of power utilization characteristics (e.g., power usage and/or restoration).

The profile development module 230 may, for example, store power utilization profile information in the power information database 225. Alternatively, for example, the profile development module 230 may provide such information to another module automatically or on request.

In general, the profile development module 230 may determine a power utilization profile for the portable communication device based at least in part on power utilization information obtained by the power utilization monitor 220. Accordingly, the scope of various aspects of the present invention should not be limited by characteristics of a particular power utilization profile or module that constructs such a profile.

The exemplary system 200 may comprise a power availability module 240 that determines power availability for the portable communication device. The power availability module 240 may, for example and without limitation, perform various functionality of the exemplary method 100 (e.g., step 140) illustrated in FIG. 1 and discussed previously.

For example, the exemplary power availability module 240 may monitor power availability for the portable communication device. The power availability module 240 may determine power availability in any of a variety of manners. The power availability module 240 may, for example, measure remaining power availability for a power supply (e.g., the power source 210). Such measuring may, for example, comprise measuring battery voltage, current or output power characteristics.

The power availability module 240 may, for example, predict battery discharge behavior. For example, the power availability module 240 may utilize information of an expected or predicted battery discharge profile to determine power availability. Such a profile may, for example, be based on manufacturer-supplied battery discharge information. Such a battery discharge profile may, for example, be based on battery discharge testing results for the battery or type of battery in question. Such a battery discharge profile may, for example, be based on monitored historical discharge and/or charge behavior for a particular battery of the portable communication device. A battery discharge profile may, for example, be based on a table of data or may, for example, be based on a mathematical formula or other description.

The power availability module 240 may, for example, store power availability information in the power information database 225. Alternatively, the power availability module 240 may provide such information to another module automatically or on request.

In general, the power availability module 240 may determine power availability for the portable communication device. Accordingly, the scope of various aspects of the present invention should not be limited by characteristics of a particular module that determines power availability, particular manner of determining power availability, or particular apparatus that may be utilized to monitor power-related characteristics.

The exemplary system 200 may comprise a power analysis module 250 that predicts future power need for the portable communication device based at least in part on the power utilization profile determined by the profile development module 230. The power analysis module 250 may, for example and without limitation, perform various functionality of the exemplary method 100 (e.g., steps 150-180) illustrated in FIG. 1 and discussed previously.

The power analysis module 250 may, for example, receive information of the power utilization profile directly from the profile development module 230. The power analysis module 250 may also, for example, obtain information of the power utilization profile from the power information database 225. The scope of various aspects of the present invention should not be limited by characteristics of a particular source of the power utilization profile information.

The exemplary power analysis module 250 may predict future power need in any of a variety of ways. The exemplary power analysis module 250 may, for example, predict future power need for a predetermined time. Such a predetermined time may, for example, be an absolute time (e.g., 6:30 PM) or a relative time (e.g., two hours from the present time).

In an exemplary scenario, the power analysis module 250 may predict future power need for a programmed or analytically determined commuting time. In another exemplary scenario, the power analysis module 250 may predict future power need for a time period from the present moment until the next typical recharging time. In another exemplary scenario, the power analysis module 250 may predict a future point in time at which the portable communication device is likely to run out of power unless recharged. The power analysis module 250 may, for example, determine a point in the future at which predicted future power need exceeds determined power availability.

The power analysis module 250 may, for example, predict future power need in a manner commensurate with the nature of the power utilization profile determined by the profile development module 230. For example, in an exemplary scenario where the power utilization profile comprises a table of time blocks versus power utilization, the power analysis module 250 may sum products of time blocks and respective power utilization. In another exemplary scenario where the power utilization profile is characterized by a mathematical formula, the power analysis module 250 may solve the mathematical formula for a particular time or set of times.

In general, the power analysis module 250 may predict future power need for the portable communication device based at least in part on the determined power utilization profile. Accordingly, the scope of various aspects of the present invention should not be limited by characteristics of a particular module that predicts future power need or any way of making such a prediction.

The exemplary power analysis module 250 may further analyze the predicted future power need and determined power availability (e.g., as determined by the power availability module 240) to determine whether to generate a warning indicating a potential future power shortage. The power analysis module 250 may, for example, obtain information of the determined power availability from the power information database 225. Alternatively, for example, the power analysis module 250 may obtain information of the determined power availability directly from the power availability module 240.

The power analysis module 250 may perform such analysis in any of a variety of manners. In performing such analysis, the power analysis module 250 may, for example, analyze times at which the portable communication device is typically recharged. In an exemplary scenario, the power analysis module 250 may determine that even though the portable communication device is predicted to run out of power at 7:00 PM, the portable communication device is typically charged at 6:00 PM, and thus no power warning is necessary. In the same exemplary scenario, the power analysis module 250 may alternatively determine that a low level warning may still be necessary.

Also for example, in performing such analysis, the power analysis module 250 may analyze margin of error in at least one of the predicted future power need and determined power availability (e.g., as determined by the power availability module 240). In performing such analysis, the power analysis module 250 may, for example, analyze information of variance or certainty of the power utilization profile (e.g., as determined by the profile development module 230). In performing such analysis, the power analysis module 250 may, for example, determine a level of probability that the portable communication device will run out of power. In an exemplary non-limiting scenario, the power analysis module 250 may determine that a power shortage certainty level within one standard deviation (or above a particular certainty percentage threshold) warrants a low power warning, while a less certain prediction does not.

The power analysis module 250 may also, for example, determine a level or type of warning to generate. For example, the power analysis module 250 may determine to generate a first level of warning if there is a significant chance that the portable communication device will run out of power, a second level of warning if the portable communication device will probably run out of power, and a third level of warning if it is highly likely that the portable communication device will run out of power.

In general, the power analysis module 250 may analyze the predicted future power need and determined power availability to determine whether to generate a warning indicating a potential future power shortage and/or to determine what type of warning to generate. Accordingly, the scope of various aspects of the present invention should not be limited by characteristics of a particular module that analyzes predicted future power need and determined power availability to determine whether to generate such a warning or to determine what type of warning to generate.

The exemplary system 200 may comprise a user interface module 260 that generates a warning of a potential future power shortage. The user interface module 260 may, for example and without limitation, perform various aspects of the exemplary method 100 (e.g., step 180) illustrated in FIG. 1 and discussed previously. For example, if the power analysis module 250 determines that a potential future power shortage warning should be generated, then the user interface module 260 may generate the warning.

The potential future power shortage warning may comprise any of a variety of warning characteristics. For example and without limitation, a warning may be visible, audible, or physical. As mentioned previously, such a warning may be characterized by a warning level. Each level may, for example, comprise an associated warning characteristic. For example and without limitation, the user interface module 260 may provide a visual indication when there is a significant chance that the portable communication device will run out of power, a physical indication (e.g., vibrate) when it is probable that the portable communication device will run out of power, and an audible indication (e.g., beep or ring) when it is highly probable that the portable communication device will run out of power.

The exemplary user interface module 260 may, for example, communicate with a user of the portable communication device to communicate power warning control information. The user interface module 260 (e.g., in conjunction with the power analysis module 250) may thereby provide for user control of characteristics of the power warnings. For example and without limitation, a user may control characteristics of various warning types. A user may, for example, turn the potential power shortage warning on or off. A user may, for example, specify levels at which warnings should occur (e.g., probability or certainty levels). A user may, for example, associate warning characteristics with various warning levels.

In general, the user interface module 260 may communicate warning and warning control information with a user. Accordingly, the scope of various aspects of the present invention should not be limited by characteristics of particular user interface modules or user interface communications, such as, for example, characteristics of warning or warning control information communicated.

Figure 3:
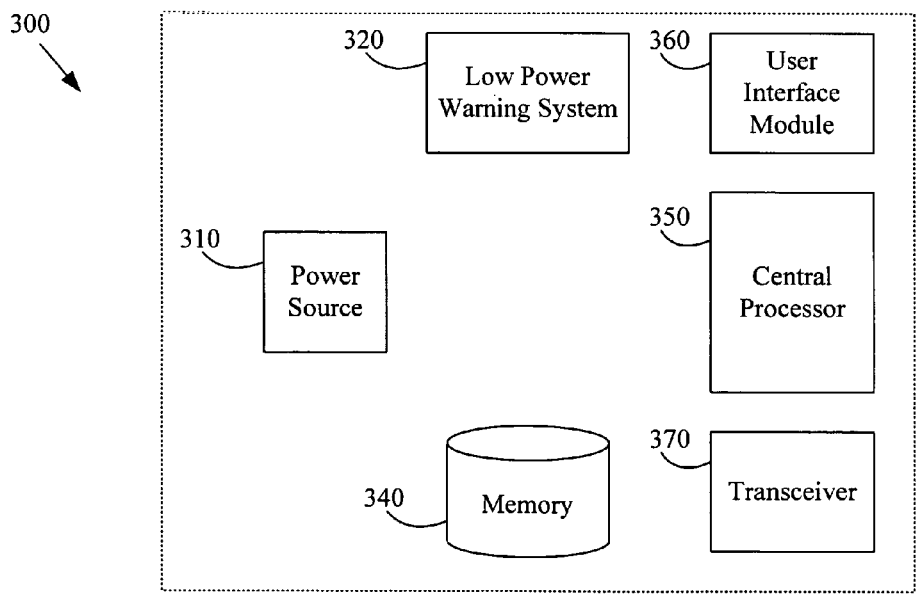
FIG. 3 illustrates an exemplary portable device that provides a low power warning based on predicted device utilization, in accordance with various aspects of the present invention.

FIG. 3 illustrates an exemplary portable electronic device 300 that provides a low power warning based on predicted device utilization, in accordance with various aspects of the present invention. The exemplary portable electronic device 300 may, for example and without limitation comprise various aspects of the exemplary system 200 illustrated in FIG. 2 and discussed previously. Additionally, various components or modules of the exemplary portable electronic device 300 may, for example and without limitation, perform various functional aspects of the exemplary method 100 illustrated in FIG. 1 and discussed previously.

The exemplary portable electronic device 300 may, for example and without limitation, be or comprise a portable communication device. The exemplary portable electronic device 300 may comprise a low power warning system 320. The exemplary low power warning system 320 may, for example and without limitation, comprise various aspects of the exemplary system 200 illustrated in FIG. 2 and discussed previously.

The portable electronic device 300 may comprise a power source 310 that provides power (or energy) to the portable electronic device 300. The portable electronic device 300 may comprise a transceiver 370 to communicate information with other electronic devices, and a user interface module 360 to communicate information with a user of the portable electronic device 300. The portable electronic device 300 may, for example, comprise a central processor 350 and memory 340. The memory 340 may, for example, comprise instructions that the central processor 350 executes to perform at least portions of the functionality of the portable electronic device 300. The central processor 350 may also, for example, utilize the memory 340 to store various information.

Various aspects of the low power warning system 320 may, for example and without limitation, be performed by various components of the portable electronic device 300. For example, the central processor 350 may perform all or a portion of the functionality of the low power warning system 320. In an exemplary scenario, the memory 340 may store computer instructions that, when executed by the central processor 350 or other processor, perform the functionality of various modules of the low power warning system 320.

For example, in an exemplary scenario where the low power warning system 320 comprises aspects of the exemplary system 200 illustrated in FIG. 2 and discussed previously, the memory 340 may store computer instructions that, when executed by the central processor 350, perform the functionality of the various modules of the exemplary system 200.

Continuing the exemplary scenario, the memory 340 may, for example and without limitation, comprise various aspects of the power information database 225 of the exemplary system 200 illustrated in FIG. 2 and discussed previously. For example, a portion of the memory 340 may be partitioned and/or utilized for storing information of the power information database 225.

Still continuing the exemplary scenario, the user interface module 360 may, for example and without limitation, comprise various aspects of the user interface module 260 of the exemplary system 200 illustrated in FIG. 2 and discussed previously. For example, the user interface module 360 may generate potential future low power warnings and communicate warning control information with a user.

Further continuing the exemplary scenario, the power source 310 may, for example and without limitation, comprise various aspects of the power source 210 of the exemplary system 200 illustrated in FIG. 2 and discussed previously. For example, low power warning system 320 may determine power availability based on the power source 310.

It should be noted that the method 100 and systems 200, 300 illustrated in FIGS. 1-3 and discussed previously are merely exemplary, and accordingly, the scope of various aspects of the present invention should not be limited by characteristics of the exemplary method 100 and systems 200, 300.

It should further be noted that various aspects of the present invention may be performed by hardware, a processor executing software instructions, or a combination thereof. Various aspects of the present invention may be integrated into a single integrated circuit or may be implemented using independent circuitry. Accordingly, the scope of various aspects of the present invention should not be limited by characteristics of any particular implementation of the various aspects.

In summary, various aspects of the present invention provide a system and method for providing a low power warning in a portable electronic device based on predicted device utilization. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a portable communication device, a method for providing a low power warning, the method comprising:
    monitoring power utilization for the portable communication device;
    determining a power utilization profile for the portable communication device based at least in part on results of the power utilization monitoring;
    determining power availability for the portable communication device;
    predicting future power need for the portable communication device based at least in part on the determined power utilization profile;
    analyzing the predicted future power need and determined power availability to determine whether to generate a warning indicating a potential future power shortage; and
    if it is determined that a potential future power shortage warning should be generated, then generating the potential future power shortage warning.

2. The method of claim 1, wherein monitoring power utilization comprises determining power consumption for an instance of portable communication device usage.

3. The method of claim 1, wherein determining a power utilization profile comprises generating a set of information comprising information of power utilization versus time of day.

4. The method of claim 1, wherein determining a power utilization profile comprises generating a set of information comprising information of power utilization for a first type of day and power utilization for a second type of day.

5. The method of claim 1, wherein determining power availability comprises monitoring power availability for the portable communication device.

6. The method of claim 1, wherein determining power availability comprises determining power availability based at least in part on a battery discharge profile.

7. The method of claim 1, wherein determining power availability comprises determining power availability based at least in part on monitored discharge behavior of a particular battery of the portable communication device.

8. The method of claim 1, wherein predicting future power need comprises predicting future power need for operation until a particular time of day.

9. The method of claim 1, wherein predicting future power need comprises determining a point in the future that predicted future power need exceeds determined power availability.

10. The method of claim 1, wherein analyzing the predicted future power need and determined power availability comprises considering times at which the portable communication device is typically charged.

11. The method of claim 1, wherein analyzing the predicted future power need and determined power availability comprises determining a level of warning to generate.

12. The method of claim 1, wherein analyzing the predicted future power need and determined power availability comprises determining a probability of future power shortage.

13. The method of claim 1, further comprising communicating power warning control information with a user, wherein analyzing the predicted future power need and determined power availability comprises analyzing the power warning control information.

14. A system for providing a low power warning in a portable communication device, the system comprising:
    at least one module that operates to, at least:
        monitor power utilization for the portable communication device;
        determine a power utilization profile for the portable communication device based at least in part on the monitored power utilization;
        determine power availability for the portable communication device;
        predict future power need for the portable communication device based at least in part on the power utilization profile;
        analyze the predicted future power need and the determined power availability to determine whether to generate a warning indicating a potential future power shortage; and
        generate a warning of potential future power shortage if it is determined that a potential future power shortage warning should be generated.

15. The system of claim 14, wherein the at least one module comprises:
    a power utilization monitor;
    a profile development module;
    a power availability module;
    a power analysis module; and
    a user interface module.

16. The system of claim 14, wherein the at least one module operates to determine power consumption for an instance of portable communication device usage.

17. The system of claim 14, wherein the at least one module operates to generate a set of information comprising information of power utilization versus time of day.

18. The system of claim 14, wherein the at least one module operates to generate a set of information comprising information of power utilization for a first type of day and power utilization for a second type of day.

19. The system of claim 14, wherein the at least one module operates to monitor power availability for the portable communication device.

20. The system of claim 14, wherein the at least one module operates to determine power availability based at least in part on a battery discharge profile.

21. The system of claim 14, wherein the at least one module operates to determine power availability based at least in part on monitored discharge behavior of a particular battery of the portable communication device.

22. The system of claim 14, wherein the at least one module operates to predict future power need for operation until a particular time of day.

23. The system of claim 14, wherein the at least one module operates to determine a point in the future that predicted future power need exceeds determined power availability.

24. The system of claim 14, wherein the at least one module operates to analyze the predicted future power need and determined power availability by, at least in part, considering times at which the portable communication device is typically charged.

25. The system of claim 14, wherein the at least one module operates to determine a level of warning to generate.

26. The system of claim 14, wherein the at least one module operates to analyze the predicted future power need and determined power availability by, at least in part, determining a probability of future power shortage.

27. The system of claim 14, wherein the at least one module operates to:
   communicate power warning control information with a user; and
   analyze the power warning control information in determining whether to generate a warning.

28. A portable electronic device comprising a low power warning system, wherein the low power warning system comprises:
   at least one module that operates to, at least:
      monitor power utilization for the portable electronic device;
      determine a power utilization profile for the portable electronic device based at least in part on the monitored power utilization;
      determine power availability for the portable electronic device;
      predict future power need for the portable electronic device based at least in part on the power utilization profile;
      analyze the predicted future power need and the determined power availability to determine whether to generate a warning indicating a potential future power shortage; and
      generate a warning of potential future power shortage if it is determined that a potential future power shortage warning should be generated.

29. The portable electronic device of claim 28, wherein the portable electronic device comprises a portable communication device.

30. The portable electronic device of claim 28, wherein the portable electronic device is a portable communication device.

* * * * *